United States Patent
Woodyard et al.

(10) Patent No.: US 12,052,226 B2
(45) Date of Patent: Jul. 30, 2024

(54) REDUCING SENSITIVE DATA EXPOSURE IN HUB-AND-SPOKE REMOTE MANAGEMENT ARCHITECTURES

(71) Applicant: EMC IP Holding Company LLC, Hopkinton, MA (US)

(72) Inventors: John Woodyard, Fall City, WA (US); Ching-Yun Chao, Austin, TX (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 358 days.

(21) Appl. No.: 17/490,993

(22) Filed: Sep. 30, 2021

(65) Prior Publication Data
US 2023/0096183 A1    Mar. 30, 2023

(51) Int. Cl.
*H04L 9/40* (2022.01)

(52) U.S. Cl.
CPC ...... *H04L 63/0414* (2013.01); *H04L 63/0435* (2013.01); *H04L 63/083* (2013.01); *H04L 63/0876* (2013.01); *H04L 63/102* (2013.01); *H04L 63/20* (2013.01)

(58) Field of Classification Search
CPC . H04L 63/0414; H04L 63/0432; H04L 63/20; H04L 63/102
See application file for complete search history.

(56) References Cited

U.S. PATENT DOCUMENTS

| | | | |
|---|---|---|---|
| 7,975,030 B2 * | 7/2011 | Saeed | H04L 63/0272 709/227 |
| 8,837,729 B2 * | 9/2014 | Nikander | H04L 9/0844 380/259 |
| 9,787,645 B2 * | 10/2017 | Levi | H04L 63/0414 |
| 10,779,164 B2 * | 9/2020 | Ulrich | H04L 63/0414 |
| 11,075,892 B2 * | 7/2021 | Venkataraman | H04L 63/0236 |
| 11,232,227 B1 * | 1/2022 | Chin | H04L 63/0421 |
| 2014/0006540 A1 * | 1/2014 | Rao | H04L 67/1097 709/213 |
| 2016/0337847 A1 * | 11/2016 | Sergeev | H04W 12/03 |
| 2018/0241722 A1 * | 8/2018 | Howard | G06F 21/6245 |
| 2018/0285596 A1 * | 10/2018 | Jones | G06F 21/552 |
| 2019/0379642 A1 * | 12/2019 | Simons | H04L 63/0281 |
| 2020/0304477 A1 * | 9/2020 | Venkataraman | H04L 12/4633 |
| 2020/0320223 A1 * | 10/2020 | Narayanan | G06F 21/6254 |
| 2020/0322174 A1 * | 10/2020 | Ji | H04L 9/006 |
| 2020/0336464 A1 * | 10/2020 | Hastings | H04L 9/0841 |
| 2021/0218802 A1 * | 7/2021 | Shanker | H04L 41/0806 |

(Continued)

*Primary Examiner* — Viral S Lakhia
(74) *Attorney, Agent, or Firm* — Amin, Turocy & Watson, LLP

(57) ABSTRACT

A system can generate a non-sensitive identifier for sensitive data at a spoke in a hub-and-spoke configuration, wherein the spoke is configured to receive management commands by a hub device of the hub-and-spoke configuration. The system can store an association between the non-sensitive identifier and the sensitive data, resulting in a stored association. The system can send, to the hub device, a first indication of the non-sensitive identifier, and a second indication of a type of data of the sensitive data. The system can receive, from the hub device, a management command identifying the non-sensitive identifier. The system can identify the sensitive data based on the stored association. The system can perform the management command based on the sensitive data.

20 Claims, 10 Drawing Sheets

(56) References Cited

U.S. PATENT DOCUMENTS

| | | | | |
|---|---|---|---|---|
| 2021/0243605 A1* | 8/2021 | Ramani | ............. | H04L 63/08 |
| 2022/0321540 A1* | 10/2022 | Loman | ............. | H04L 63/102 |
| 2022/0337598 A1* | 10/2022 | Bhattacharya | ........ | H04L 63/108 |
| 2023/0087481 A1* | 3/2023 | Brevoort | ............. | G06F 21/6218 |
| | | | | 726/27 |

* cited by examiner

900

(902)

↓

CHANGE THE FIRST SENSITIVE DATA TO SECOND SENSITIVE DATA 904

↓

UPDATE THE STORED ASSOCIATION BETWEEN THE NON-SENSITIVE IDENTIFIER AND THE FIRST SENSITIVE DATA TO REFERENCE THE SECOND SENSITIVE DATA WHILE MAINTAINING THE NON-SENSITIVE IDENTIFIER CONSTANT 906

REDUCING SENSITIVE DATA EXPOSURE IN HUB-AND-SPOKE REMOTE MANAGEMENT ARCHITECTURES

BACKGROUND

Computers can be managed remotely by another computer. Where one management computer manages multiple other computers, this can be referred to as a hub-and-spoke architecture, where the management computer is the hub, and the multiple other computers are the spokes.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can generate a non-sensitive identifier for sensitive data at a spoke in a hub-and-spoke configuration, wherein the spoke is configured to receive management commands by a hub device of the hub-and-spoke configuration. The system can store an association between the non-sensitive identifier and the sensitive data, resulting in a stored association. The system can send, to the hub device, a first indication of the non-sensitive identifier, and a second indication of a type of data of the sensitive data. The system can receive, from the hub device, a management command identifying the non-sensitive identifier. The system can identify the sensitive data based on the stored association. The system can perform the management command based on the sensitive data.

An example method can comprise generating, by a system comprising a processor, an identifier for data associated with a hub-and-spoke architecture, wherein a spoke of the hub-and-spoke architecture is configured to receive management commands by a hub device of the hub-and-spoke architecture. The method can further comprise storing, by the system, an association between the identifier and the data at the spoke, resulting in a stored association. The method can further comprise receiving, by the system, a management command from the hub device, the management command comprising the identifier. The method can further comprise identifying, by the system and from the identifier, the data based on the stored association. The method can further comprise performing, by the system, the management command based on the data.

An example non-transitory computer-readable medium can comprise instructions that, in response to execution, cause a system comprising a processor to perform operations. These operations can comprise generating an identifier for data from a hub-and-spoke organization that comprises a hub node and spokes comprising a spoke corresponding to the hub node. The operations can further comprise storing an association between the identifier and the data at the spoke, resulting in a stored association. The operations can further comprise receiving a management command from the hub node that references the identifier. The operations can further comprise identifying, based on the identifier and the stored association, the data. The operations can further comprise performing the management command based on the data.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates an example process flow for changing sensitive data to facilitate reducing sensitive data exposure in hub-and-spoke remote management architectures, in accordance with an embodiment of this disclosure;

DETAILED DESCRIPTION

Overview

Figure 1:
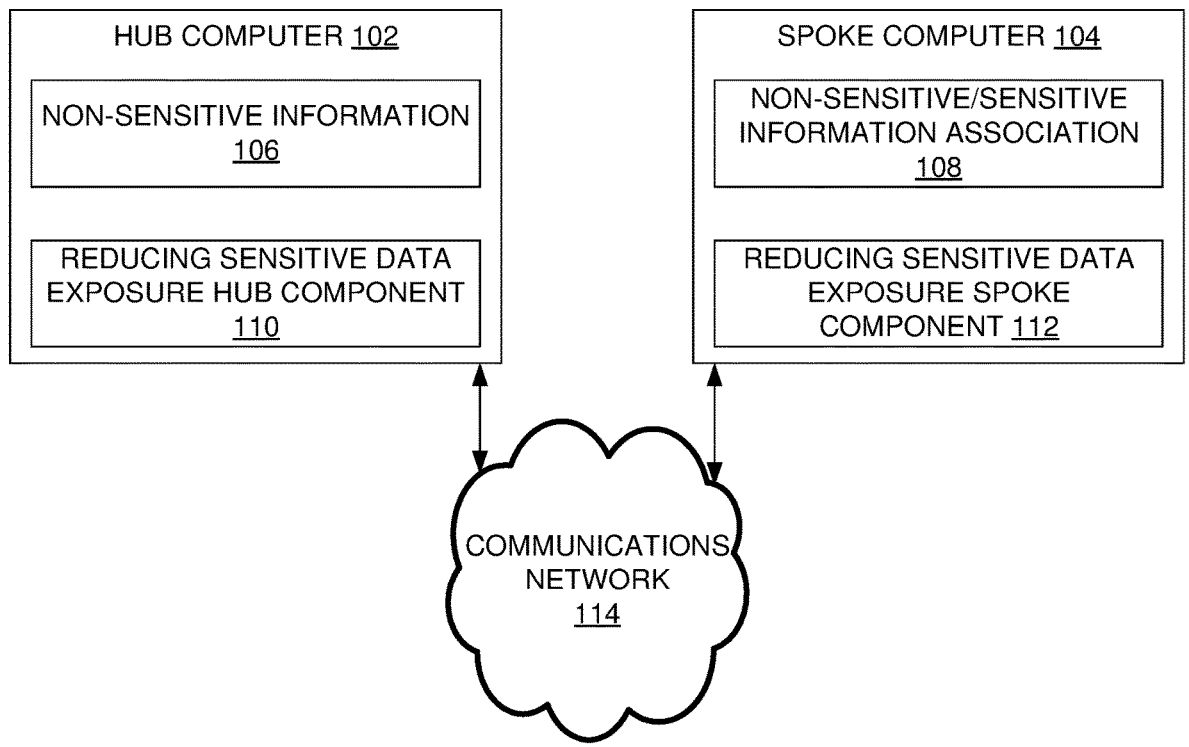
FIG. 1 illustrates an example system architecture that can facilitate reducing sensitive data exposure in hub-and-spoke remote management architectures, in accordance with an embodiment of this disclosure.

The present techniques can be implemented to permit a remote management service to authenticate against a target device that is to be managed by the remote management service, without the remote management service having knowledge of either a username or a password of the target device.

In some examples, the present techniques can be applied to hub-and-spoke management scenarios, where sensitive data related to hub operation can be held in the spokes being managed, which can reduce a risk associated with sensitive data being held in the hub and therefore an attractive target for attack.

In some examples, a hub-and-spoke management model can be implemented for internet applications with one or more centralized management hubs, and distributed spoke control nodes at edges.

In prior techniques, sensitive management information, such as topology data, hub configuration data, and spoke node configuration data including credentials can be stored and managed centrally at a hub. These approaches can store management data centrally due to this being where management user interfaces and decision logic resides. Data protection approaches, such as cryptographic techniques, can be applied to the management data to reduce a risk of attack. However, from a security perspective, the act of storing management data centrally on a hub can make the hub a target for attacks and pose a higher risk in a thread model.

To mitigate against risks associated with storing management data on a hub, the present techniques can be applied to better protect sensitive management data in hub-and-spoke management scenarios, which can reduce a likelihood of exposing sensitive management data, and thus better mitigate against a risk of attack.

An advantage of implementing the present techniques can be increased security, as credentials for a remote device at the spoke are not known by a management service at the hub. Another advantage of implementing the present techniques can be flexibility, as both usernames and passwords can be freely rotated on a remote device without making changes to records in the management service.

The present techniques can be applied to sensitive data, such as account credentials, Internet Protocol (IP) addressing schemes, and network topologies.

Prior techniques for hub-and-spoke management models can keep sensitive information, like configuration data and credential data, at one or more hub nodes. A hub node can send sensitive device credential data, along with control commands, to a spoke node, which can then authenticate to a device at the spoke. Storing sensitive data centrally at a hub can make the hub a high-value attack target. If a hub that stores sensitive information for the spokes is compromised, it can be that all devices at the spokes become vulnerable.

Sensitive data can include usernames and passwords, as well as IP addresses, a system topology, and host identifiers. The present techniques can be applied to protect various forms of sensitive data, making it easier for remote management services to operate without increasing a risk associated with sensitive data leaking.

In some examples, sensitive management information can be maintained at spoke nodes rather than at hub nodes. This approach can reduce a value of hub nodes as attack targets.

In some examples, non-sensitive identifiers can be used to represent sensitive data. A spoke node can map a non-sensitive identifier to sensitive data locally. The non-sensitive identifiers can be kept at hub nodes instead of the corresponding sensitive data. Hub nodes and spoke nodes can describe a management system and a complete topology of devices using these non-sensitive identifiers. Then, should a hub node be compromised, it can lack sensitive data that can be exposed.

Example Architectures

FIG. 1 illustrates an example system architecture that can facilitate reducing sensitive data exposure in hub-and-spoke remote management architectures, in accordance with an embodiment of this disclosure. As depicted, system architecture 100 comprises hub computer 102, spoke computer 104, and communications network 114. In turn, hub computer 102 comprises non-sensitive information 106, and reducing sensitive data exposure hub component 110; and spoke computer 104 comprises non-sensitive/sensitive information association 108, and reducing sensitive data exposure spoke component 112.

Figure 10:
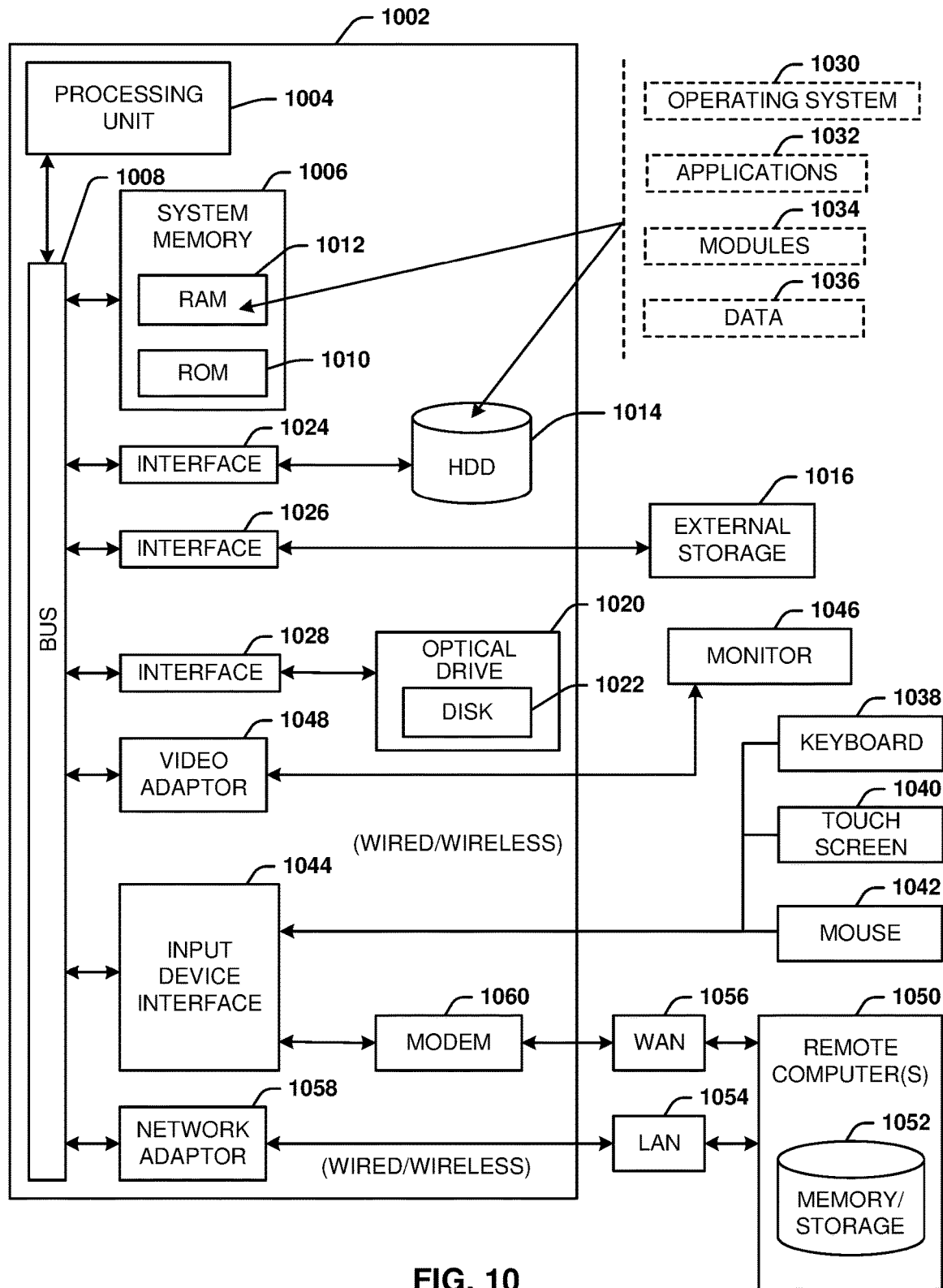
FIG. 10 illustrates an example block diagram of a computer operable to execute an embodiment of this disclosure.

Each of hub computer 102 and spoke computer 104 can be implemented with one or more instances of computer 1002 of FIG. 10. In some examples, spoke computer 104 comprises a plurality of computers, such as a plurality of computers in a data center. In such examples, spoke computer 104 can comprise a control node for the data center, which implements management commands for the data center that are issued by hub computer 102.

Communications network 114 can comprise a computer communications network, such as the INTERNET.

Hub computer 102 and spoke computer 104 can communicate via communications network 114. Hub computer 102 can issue management commands to spoke computer 104 that spoke computer 104 carries out.

In the course of hub computer 102 issuing management commands to spoke computer 104, sensitive information can be referenced. In some examples, hub computer 102 has non-sensitive information 106 that it uses to identify sensitive information stored by spoke computer 104, and maintained by spoke computer 104 in non-sensitive/sensitive information association 108 (which can comprise a database). In operating in this manner, this sensitive information is not stored on hub computer 102, nor is it transmitted via communications network 114, thus reducing a surface of an attack vector whereby this sensitive information can be impermissibly obtained.

Hub computer 102 can comprise reducing sensitive data exposure hub component 110. Reducing sensitive data exposure hub component 110 can use non-sensitive information 106 to create and issue management commands to spoke computer 104. Spoke computer 104 can comprise reducing sensitive data exposure spoke component 112. Reducing sensitive data exposure spoke component 112 can create and maintain associations between sensitive information and non-sensitive information, store those associations in non-sensitive/sensitive information association 108, send non-sensitive identifiers to hub computer 102, and translate non-sensitive identifiers received from hub computer 102 into sensitive identifiers using non-sensitive/sensitive information association 108.

In facilitating reducing sensitive data exposure in hub-and-spoke remote management architectures, system architecture can implement part(s) of the process flows of FIGS. 6-9.

Figure 2:
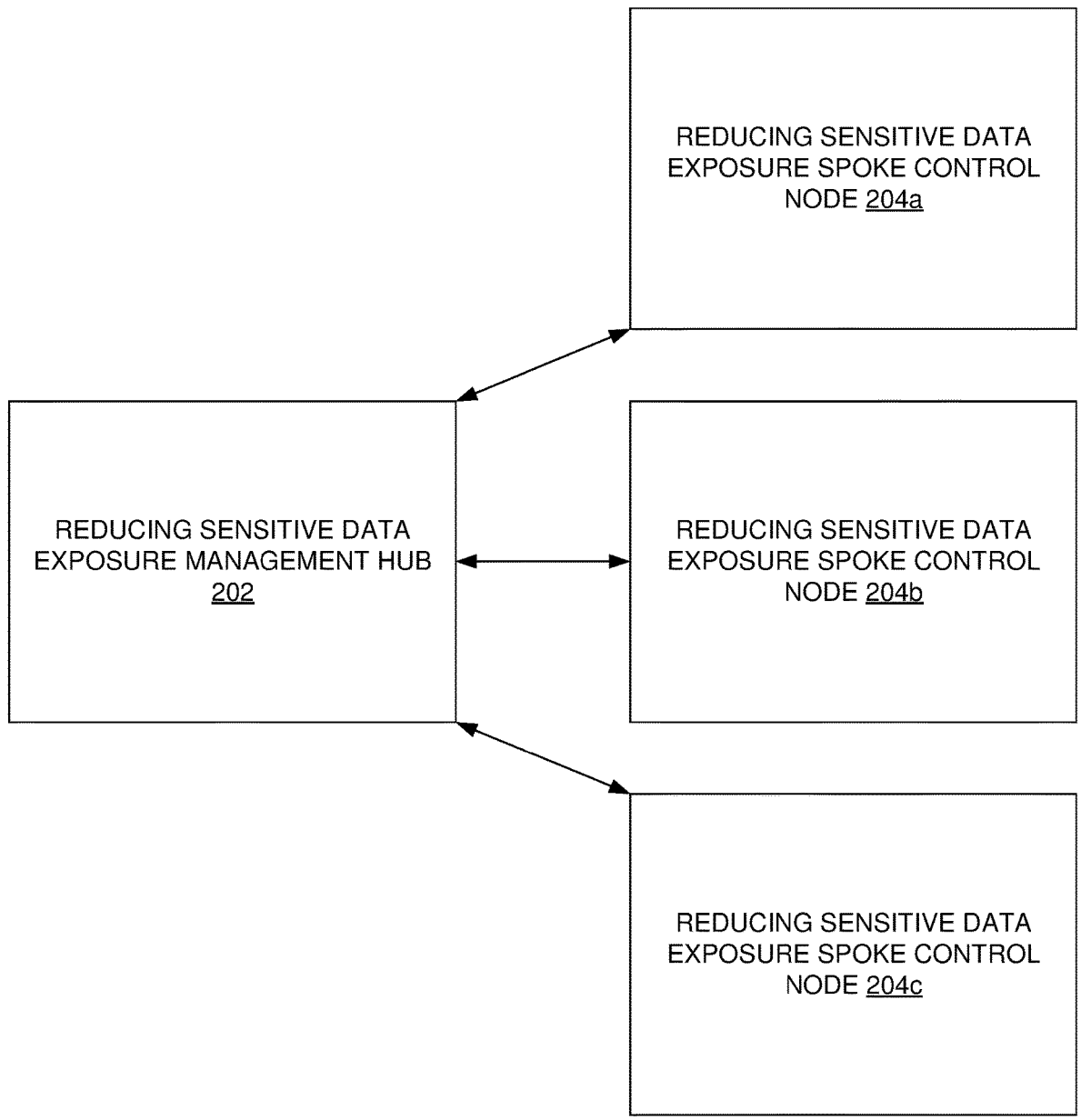
FIG. 2 illustrates another example system architecture that can facilitate reducing sensitive data exposure in hub-and-spoke remote management architectures, in accordance with an embodiment of this disclosure.

FIG. 2 illustrates another example system architecture 200 that can facilitate reducing sensitive data exposure in hub-and-spoke remote management architectures, in accordance with an embodiment of this disclosure. System architecture comprises reducing sensitive data exposure management hub 202, reducing sensitive data exposure spoke control node 204a, reducing sensitive data exposure spoke control node 204b, and reducing sensitive data exposure spoke control node 204c.

In some examples, reducing sensitive data exposure management hub 202 can be similar to hub computer 102 of FIG. 1; and each of reducing sensitive data exposure management hub 202, reducing sensitive data exposure spoke control node 204a, reducing sensitive data exposure spoke control node 204*b*, and reducing sensitive data exposure spoke control node 204*c* can be similar to spoke computer 104 of FIG. 1.

As depicted, reducing sensitive data exposure management hub 202 can issue management commands to each of reducing sensitive data exposure spoke control node 204*a*, reducing sensitive data exposure spoke control node 204*b*, and reducing sensitive data exposure spoke control node 204*c* to manage these spoke control nodes. In managing these spoke nodes, reducing sensitive data exposure management hub 202 can avoid storing sensitive information of these spoke nodes. Instead, by implementing reducing sensitive data exposure in hub-and-spoke remote management architectures in system architecture 200, sensitive information of each spoke control node can be kept on the respective spoke control node. That way, reducing sensitive data exposure management hub 202 is not a central repository of sensitive information that is a high-value attack target.

Figure 3:
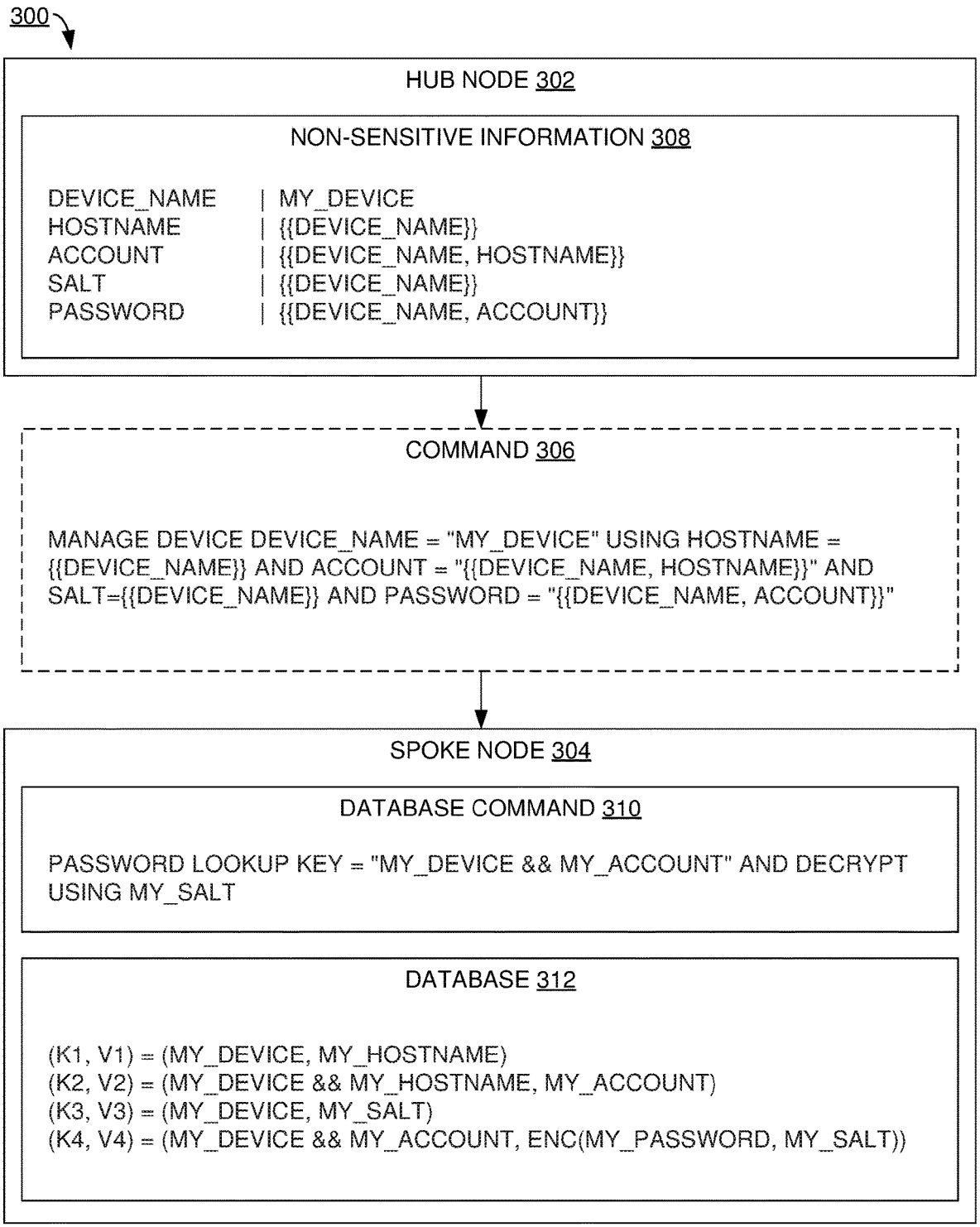
FIG. 3 illustrates an example system architecture that uses a non-sensitive identifier to uniquely identify a piece of sensitive data, which can facilitate reducing sensitive data exposure in hub-and-spoke remote management architectures, in accordance with an embodiment of this disclosure.

FIG. 3 illustrates an example system architecture 300 that uses a non-sensitive identifier to uniquely identify a piece of sensitive data, which can facilitate reducing sensitive data exposure in hub-and-spoke remote management architectures, in accordance with an embodiment of this disclosure.

System architecture 300 comprises hub node 302, spoke node 304, and command 306. In some examples, hub node 302 can be similar to hub computer 102 of FIG. 1, and spoke node 304 can be similar to spoke computer 104 of FIG. 1. Command 306 can comprise a management command issued by hub node 302 and sent to spoke node 304 to be carried out.

Hub node 302 comprises non-sensitive information 308. Spoke node 304 comprises database command 310 and database 312.

Take an example where a spoke control node (e.g., spoke node 304) authenticates to a device as part of managing that device. Authenticating can include providing the device name, the hostname, the account name, salt, and a password to access the target device. In examples according to the present techniques, hub node 302 can know the device name but not the other information (e.g., hostname, account name). The other data can be referenced by hub node 302 using non-sensitive symbolic names in non-sensitive information 308. This approach can use a combination of the device name and a value of a hostname as a key to look up the account name and password that are stored by secure local storage at spoke node 304 in database 312. Then, the sensitive hostname, account name, salt, and password can be kept on spoke node 304, and can be represented by their symbolic lookup key on hub node 302.

As shown in system architecture 300, the password can be represented on a console at hub node 302 by "{{device_name,account}}" which states that the password is represented by using the value of device_name and the value of account as lookup key at spoke node 304. A password can be encrypted in database 312 using a salt value which is also only available at spoke node 304. This example can illustrate the advantage of the present techniques that, in some examples, sensitive is only available at spoke nodes while hub nodes can effectively identify the sensitive data using symbolic name representation.

Figure 4:
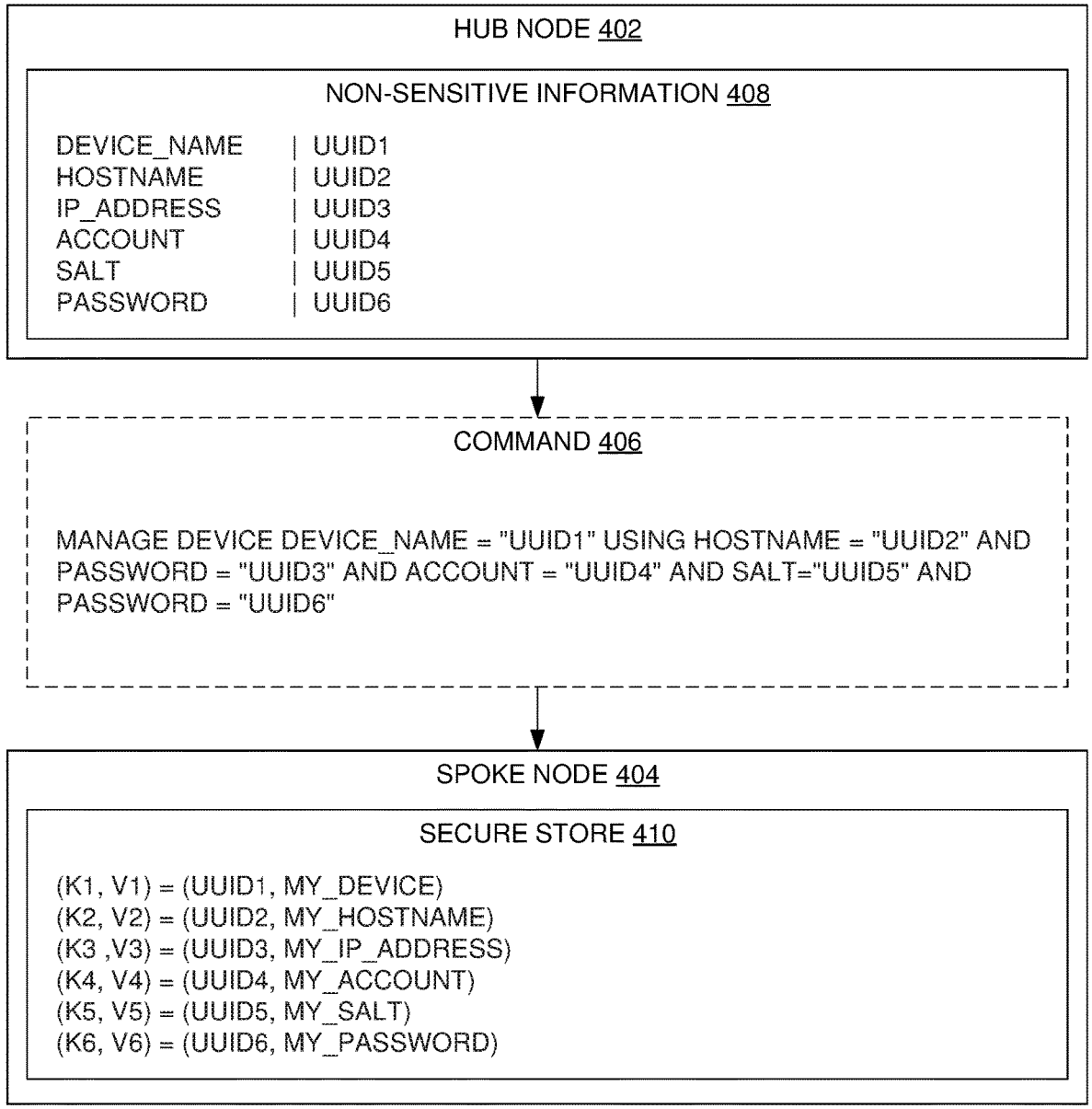
FIG. 4 illustrates an example system architecture that uses a unique, non-sensitive key to identify a sensitive piece of data, which can facilitate reducing sensitive data exposure in hub-and-spoke remote management architectures, in accordance with an embodiment of this disclosure.

FIG. 4 illustrates an example system architecture 400 that uses a unique, non-sensitive key to identify a sensitive piece of data, which can facilitate reducing sensitive data exposure in hub-and-spoke remote management architectures, in accordance with an embodiment of this disclosure.

System architecture 400 comprises hub node 402, spoke node 404, and command 406. In some examples, hub node 402 can be similar to hub computer 102 of FIG. 1, and spoke node 404 can be similar to spoke computer 104 of FIG. 1. Command 406 can comprise a management command issued by hub node 402 and sent to spoke node 404 to be carried out.

Hub node 402 comprises non-sensitive information 408. Spoke node 404 comprises secure store 410.

System architecture 300 of FIG. 3, generally uses a non-sensitive identifier to uniquely identify a piece of sensitive data. In system architecture 300, a host node can possess the device name, and other identifiers of sensitive information can be determined from the device name.

In contrast, system architecture 400 generally uses separate non-sensitive identifiers for each piece of sensitive information. In some examples, these non-sensitive identifiers can comprise a universally unique identifier (UUID), a monotonically increasing number (e.g., 1, 2, 3, etc.), or a timestamp.

In some examples, spoke node 404 generates a unique identifier, maps the unique identifier to a piece of sensitive data, and stores the pair of data in secure store 410. Spoke node 404 can use these non-sensitive identifiers to represent a device, a salt value, an IP address, an account name, and a password. Then spoke node 404 can send these identifiers to hub node 402. Note that an IP address may be determined on a spoke node, e.g., a dynamic host control protocol (DHCP) IP address, and not available at hub node 402.

That is, hub node 402 can identify such IP addresses using a non-sensitive symbolic name without knowing the actual corresponding values of sensitive information. For example, in service and support scenarios, a customer and service reliability engineer can effective discuss issues using symbolic names. They can visualize the topology without revealing sensitive data.

This approach in system architecture 400 can be extended to use non-sensitive identifiers to describe a cluster and resources of the cluster or a data center and resources of the data center. This approach can permit users to visualize the topology of a whole data center including sensitive configuration data, without revealing sensitive data.

Furthermore, a combination of multiple unique identifiers like UUID and timestamp can be implemented.

Figure 5:
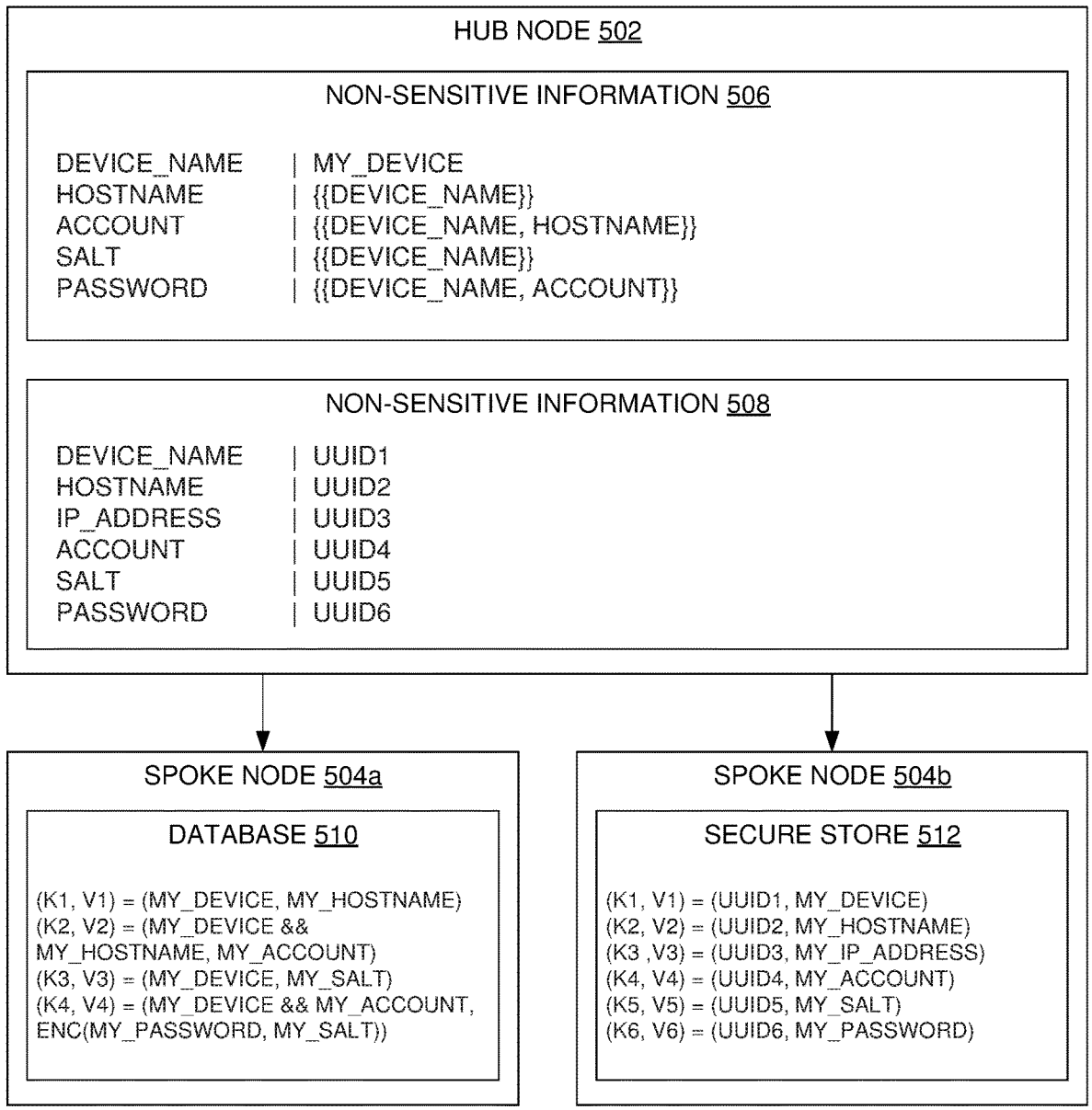
FIG. 5 illustrates an example system architecture that uses a combination of a non-sensitive identifier and a unique, non-sensitive key to identify a sensitive piece of data, which can facilitate reducing sensitive data exposure in hub-and-spoke remote management architectures, in accordance with an embodiment of this disclosure.

FIG. 5 illustrates an example system architecture 500 that uses a combination of a non-sensitive identifier and a unique, non-sensitive key to identify a sensitive piece of data, which can facilitate reducing sensitive data exposure in hub-and-spoke remote management architectures, in accordance with an embodiment of this disclosure.

System architecture 500 can comprise a combination of system architecture 300 of FIG. 3 and system architecture 400 of FIG. 4, where some spoke nodes are configured to use the approach of system architecture 300 and other spoke nodes are configured to use the approach of system architecture 400, while the hub node is configured to use both architectures.

System architecture 500 comprises hub node 502 spoke node 504*a*, and spoke node 504*b*. In some examples, hub node 502 can be similar to hub computer 102 of FIG. 1, and spoke node 504*a* and spoke node 504*b* can be similar to spoke computer 104 of FIG. 1.

Hub node 502 comprises non-sensitive information 506 (which can be similar to non-sensitive information 308 of FIG. 3) and non-sensitive information 508 (which can be similar to non-sensitive information 408 of FIG. 4). Spoke node 504*a* comprises database 510, and spoke node 504*b* comprises secure store 512.

When interacting with spoke node 504a, hub node 502 can use non-sensitive information 506 in an approach similar to system architecture 300. When interacting with spoke node 504b, hub node 502 can use non-sensitive information 508 in an approach similar to system architecture 400.

It can be appreciated that there can be examples that implement these techniques in different ways. In some examples, a unique key can be generated at a hub node, and in other examples, a unique key can be generated at a spoke control node. In some examples, a password can be generated at a hub node, and in other examples, a password can be generated at a spoke control node.

Example Process Flows

Figure 6:
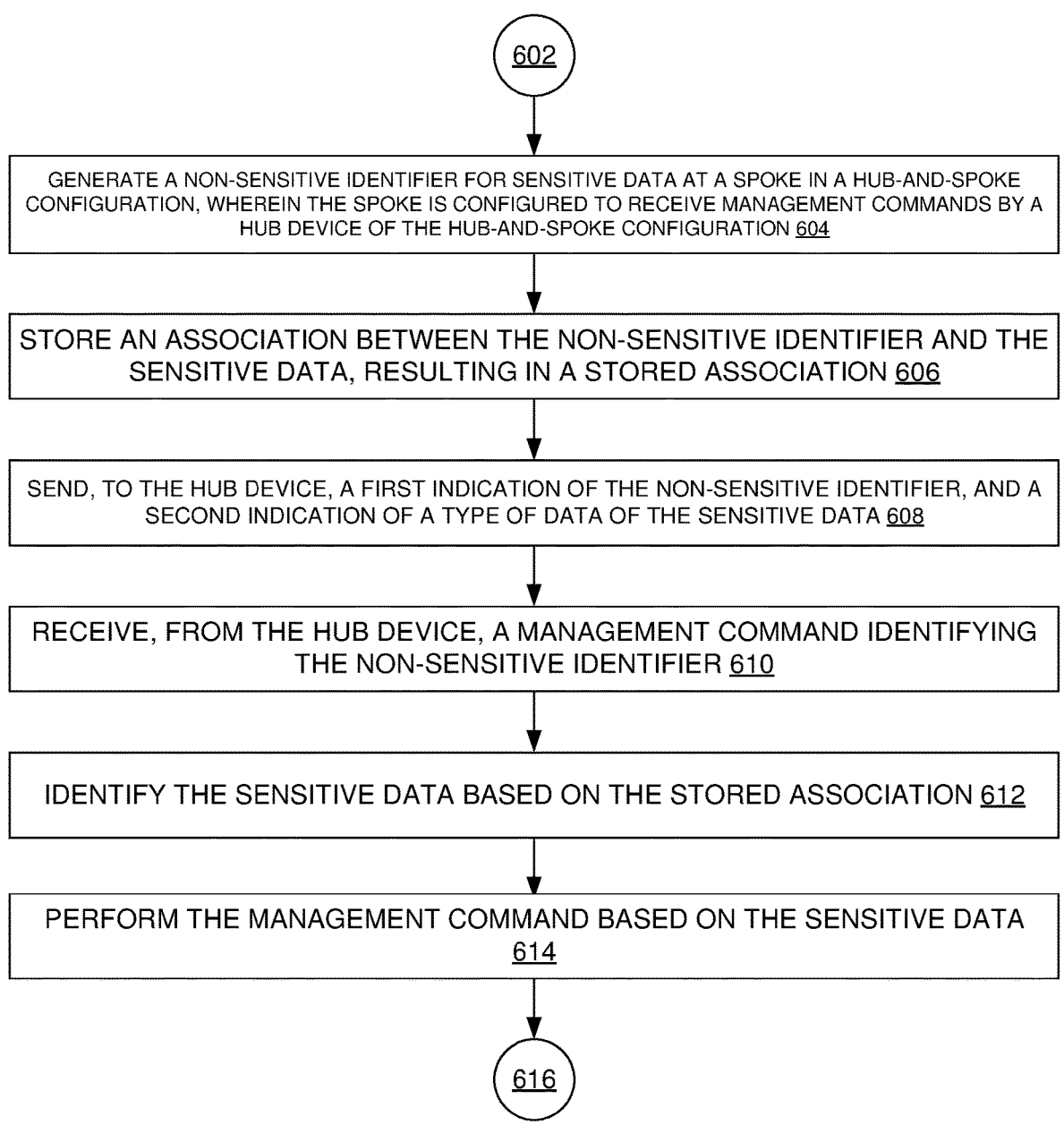
FIG. 6 illustrates an example process flow that can facilitate reducing sensitive data exposure in hub-and-spoke remote management architectures, in accordance with an embodiment of this disclosure.

FIG. 6 illustrates an example process flow 600 that can facilitate reducing sensitive data exposure in hub-and-spoke remote management architectures, in accordance with an embodiment of this disclosure. In some examples, one or more embodiments of process flow 600 can be implemented by system architecture 100 of FIG. 1, system architecture 200 of FIG. 2, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, and/or process flow 900 of FIG. 9.

Process flow 600 begins with 602, and moves to operation 604. Operation 604 depicts generating a non-sensitive identifier for sensitive data at a spoke in a hub-and-spoke configuration, wherein the spoke is configured to receive management commands by a hub device of the hub-and-spoke configuration. That is, a non-sensitive identifier can be created to reference sensitive data. In some examples, this can be performed at a hub computer, and in other examples, this can be performed at a spoke computer. The hub is configured to manage the spoke.

In some examples, the sensitive data comprises an identifier of a device of the spoke or an access credential to the device. That is, sensitive data can comprise information that is deemed sensitive because it provides insight to a system architecture or topology of the spoke computer, or provides access the spoke computer. This sensitive data can comprise a device name, a hostname, an account name, a password, a salt, and an Internet Protocol (IP) address.

In some examples, the generating of the non-sensitive identifier is based on a universally unique identifier, a monotonically increasing number, or a timestamp. That is, the non-sensitive identifier can be procedurally generated, in a manner that does not give insight to what the corresponding sensitive data is.

In some examples, the spoke comprises a control node and a group of devices, wherein the control node is configured to control the group of devices. In some examples, the control node is configured to control a respective application on the group of devices. That is, the spoke can be more than one computer, such as a data center. The spoke can comprise a control node that is used to control a collection of assets, such as hardware devices, software, applications, and data.

After operation 604, process flow 600 moves to operation 606.

Operation 606 depicts storing an association between the non-sensitive identifier and the sensitive data, resulting in a stored association. That is, an association between the non-sensitive identifier and the sensitive data can be stored, and in some examples, this can be stored at a spoke computer.

After operation 606, process flow 600 moves to operation 608.

Operation 608 depicts sending, to the hub device, a first indication of the non-sensitive identifier, and a second indication of a type of data of the sensitive data. That is, a spoke computer can send the non-sensitive identifier to a hub computer, along with an indication of what the non-sensitive identifier references (e.g., a hostname or a username).

After operation 608, process flow 600 moves to operation 610.

Operation 610 depicts receiving, from the hub device, a management command identifying the non-sensitive identifier. That is, a hub computer can issue a management command to the spoke, and in this management command, the hub computer can use the non-sensitive identifier (since, in examples, the hub computer lacks knowledge of what the corresponding sensitive data is).

After operation 610, process flow 600 moves to operation 612.

Operation 612 depicts identifying the sensitive data based on the stored association. That is, the spoke computer can replace the non-sensitive identifier with the sensitive data as applied to the management command.

After operation 612, process flow 600 moves to operation 614.

Operation 614 depicts performing the management command based on the sensitive data. That is, the spoke computer can carry out the management command (that referenced the non-sensitive identifier) with the sensitive data.

After operation 614, process flow 600 moves to 616, where process flow 600 ends.

Figure 7:
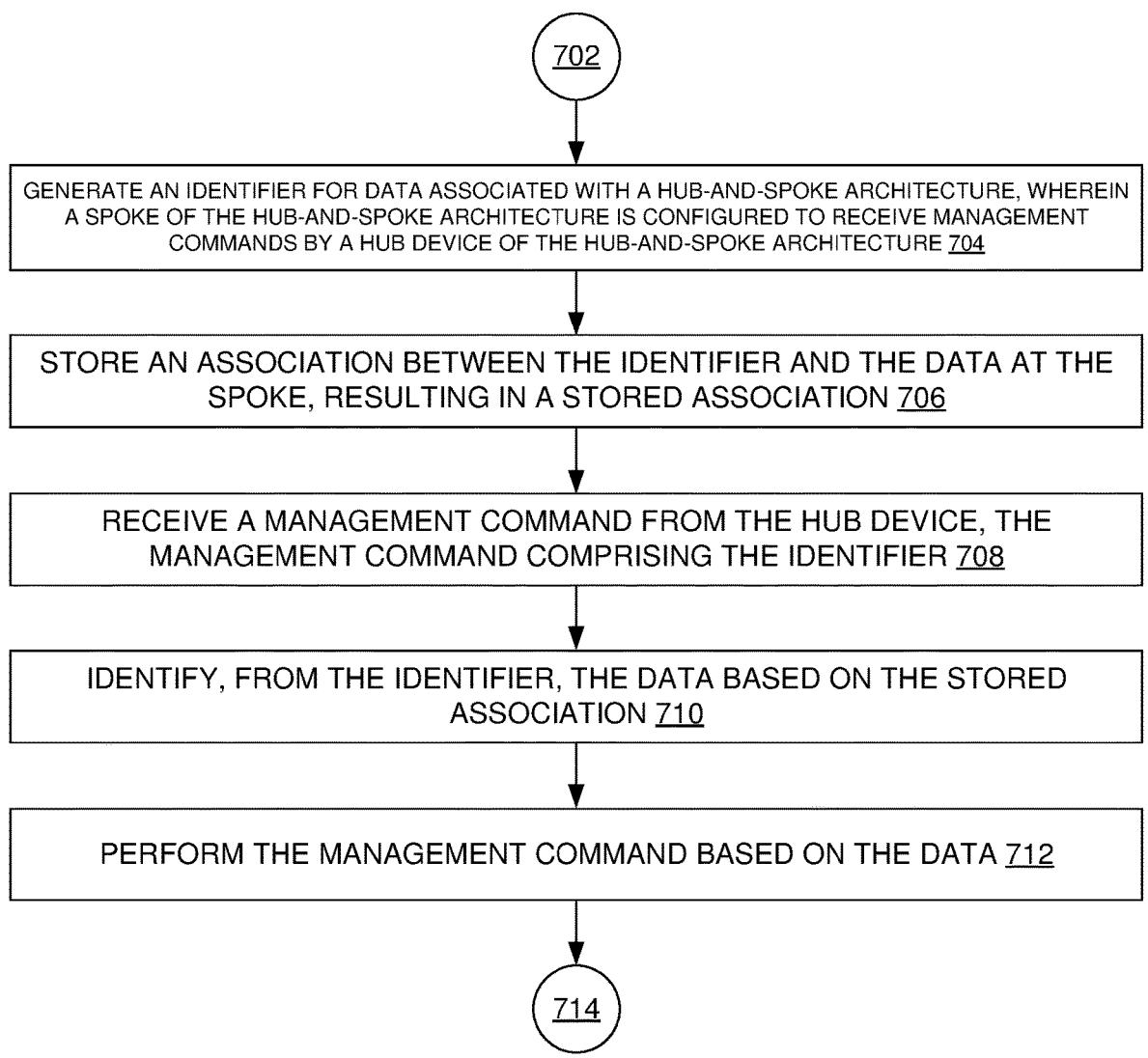
FIG. 7 illustrates another example process flow that can facilitate reducing sensitive data exposure in hub-and-spoke remote management architectures, in accordance with an embodiment of this disclosure.

FIG. 7 illustrates another example process flow that can facilitate reducing sensitive data exposure in hub-and-spoke remote management architectures, in accordance with an embodiment of this disclosure. In some examples, one or more embodiments of process flow 700 can be implemented by system architecture 100 of FIG. 1, system architecture 200 of FIG. 2, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, and/or process flow 900 of FIG. 9.

Process flow 700 begins with 702, and moves to operation 704. Operation 704 depicts generating an identifier for data associated with a hub-and-spoke architecture, wherein a spoke of the hub-and-spoke architecture is configured to receive management commands by a hub device of the hub-and-spoke architecture. In some examples, operation 704 can be implemented in a similar manner as operation 604 of FIG. 6.

In some examples, the identifier identifies a device name of a device of the spoke. That is, a hub computer can use a non-sensitive identifier for a device that is used to determine a device name of the spoke computer.

In some examples, the data is used to determine a hostname of the device. That is, a hostname for the spoke computer can be determined based on the device name.

In some examples, the identifier and the hostname are used to determine an account of the device. That is, an account of the spoke computer can be determined based on the device name and the hostname.

In some examples, the identifier and the account are used to determine a password of the device. That is, a password of the spoke computer can be determined based on the device name and the account.

In some examples, the data is used to determine a salt of the device. That is, a salt can be determined based on a device name A salt can be random data that used in storing a password as an input to a hash that hashes the password.

After operation 704, process flow 700 moves to operation 706.

Operation 706 depicts storing an association between the identifier and the data at the spoke, resulting in a stored association. In some examples, operation 706 can be implemented in a similar manner as operation 606 of FIG. 6.

In some examples, the stored association between the identifier and the data comprises a key-value pair, wherein a key of the key-value pair comprises the identifier, and wherein a value of the key-value pair comprises the data. That is, an association between a non-sensitive identifier and sensitive data can be stored as a key-value pair, where the key is the non-sensitive identifier.

After operation 706, process flow 700 moves to operation 708.

Operation 708 depicts receiving a management command from the hub device, the management command comprising the identifier. In some examples, operation 708 can be implemented in a similar manner as operation 610 of FIG. 6.

After operation 708, process flow 700 moves to operation 710.

Operation 710 depicts identifying, from the identifier, the data based on the stored association. In some examples, operation 710 can be implemented in a similar manner as operation 612 of FIG. 6.

After operation 710, process flow 700 moves to operation 712.

Operation 712 depicts performing the management command based on the data. In some examples, operation 712 can be implemented in a similar manner as operation 614 of FIG. 6.

After operation 712, process flow 700 moves to 714, where process flow 700 ends.

Figure 8:
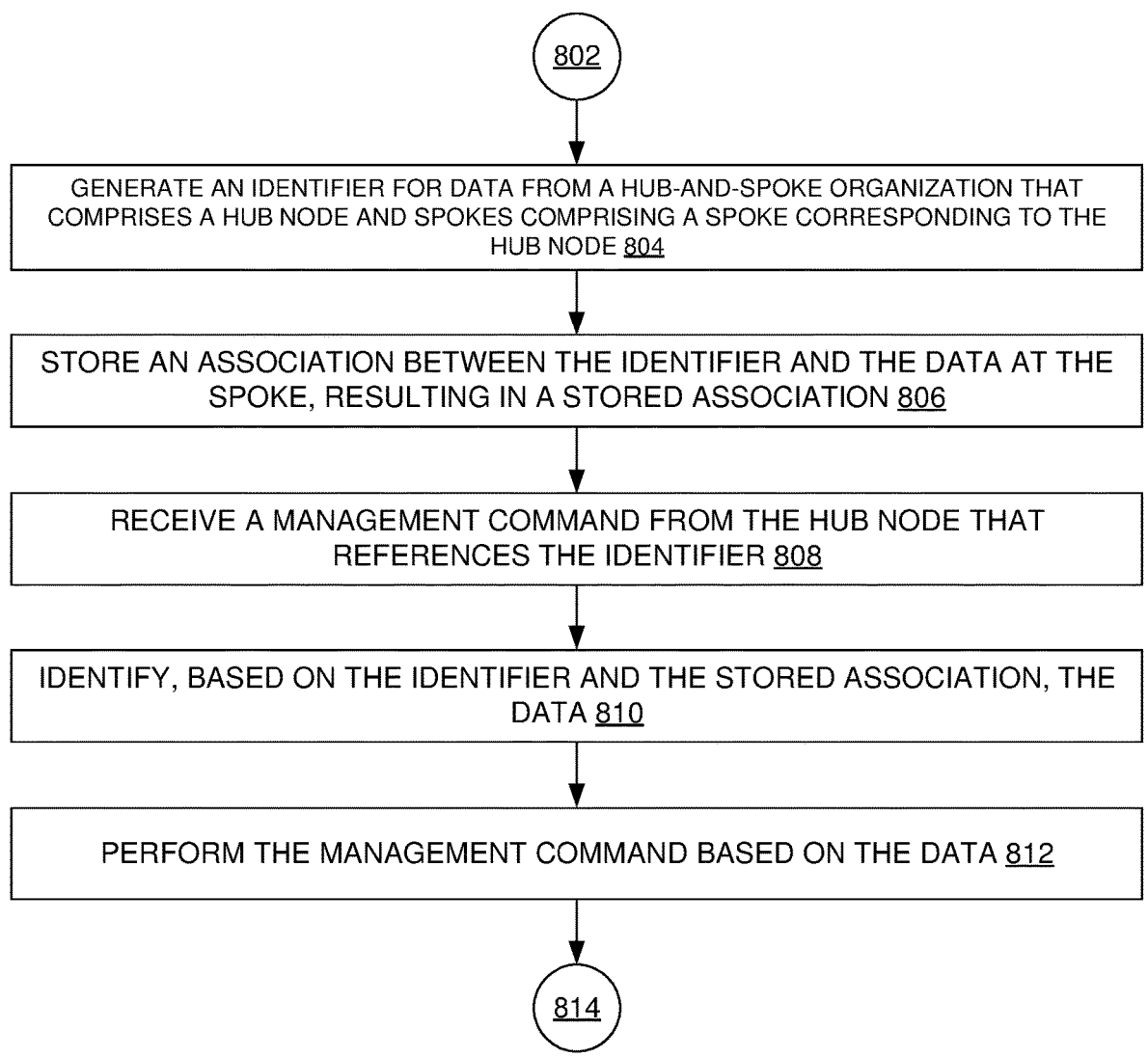
FIG. 8 illustrates another example process flow that can facilitate reducing sensitive data exposure in hub-and-spoke remote management architectures, in accordance with an embodiment of this disclosure.

FIG. 8 illustrates another example process flow that can facilitate reducing sensitive data exposure in hub-and-spoke remote management architectures, in accordance with an embodiment of this disclosure. In some examples, one or more embodiments of process flow 800 can be implemented by system architecture 100 of FIG. 1, system architecture 200 of FIG. 2, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, and/or process flow 900 of FIG. 9.

Process flow 800 begins with 802, and moves to operation 804. Operation 804 depicts generating an identifier for data from a hub-and-spoke organization that comprises a hub node and spokes comprising a spoke corresponding to the hub node. In some examples, operation 804 can be implemented in a similar manner as operation 604 of FIG. 6.

After operation 804, process flow 800 moves to operation 806.

Operation 806 depicts storing an association between the identifier and the data at the spoke, resulting in a stored association. In some examples, operation 806 can be implemented in a similar manner as operation 606 of FIG. 6.

In some examples, the identifier is generated at the hub node. In some examples, the identifier is generated at a spoke control node of the spoke.

In some examples, the data comprises a password, and the data is generated at the hub node. In some examples, the data comprises a password, and the data is generated at a spoke control node of the spoke.

After operation 806, process flow 800 moves to operation 808.

Operation 808 depicts receiving a management command from the hub node that references the identifier. In some examples, operation 808 can be implemented in a similar manner as operation 610 of FIG. 6.

After operation 808, process flow 800 moves to operation 810.

Operation 810 depicts identifying, based on the identifier and the stored association, the data. In some examples, operation 810 can be implemented in a similar manner as operation 612 of FIG. 6.

After operation 810, process flow 800 moves to operation 812.

Operation 812 depicts performing the management command based on the data. In some examples, operation 812 can be implemented in a similar manner as operation 614 of FIG. 6.

In some examples, the spoke comprises multiple devices arranged in a topology, the spoke is configured to receive management commands from the hub node that identify the identifier, the management commands manage the multiple devices, and the hub node lacks knowledge of the topology. That is, a hub can manage a spoke without knowing a topology of the spoke (e.g., a configuration of computers in a network that make up the spoke).

After operation 812, process flow 800 moves to 814, where process flow 800 ends.

FIG. 9 illustrates an example process flow for changing sensitive data to facilitate reducing sensitive data exposure in hub-and-spoke remote management architectures, in accordance with an embodiment of this disclosure. In some examples, one or more embodiments of process flow 900 can be implemented by system architecture 100 of FIG. 1, system architecture 200 of FIG. 2, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, and/or process flow 800 of FIG. 8.

Process flow 900 begins with 902, and moves to operation 904. In some examples, a first sensitive data is already stored, and associated with a non-sensitive identifier. Operation 904 comprises changing the first sensitive data to second sensitive data. That can comprise, for example, changing a password associated with a user account, where the password is sensitive data. After operation 904, process flow 900 moves to operation 906.

Operation 906 comprises updating the stored association between the non-sensitive identifier and the first sensitive data to reference the second sensitive data while maintaining the non-sensitive identifier constant. That is, where the sensitive data is changed, the association between that sensitive data and the non-sensitive identifier can be updated to reflect that change, while the non-sensitive identifier itself can remain the same. Thus, one non-sensitive identifier can be used to reference sensitive data (e.g., a password), even while the contents of that sensitive data change over time.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of hub computer 102 or spoke computer 104 of FIG. 1.

In some examples, computing environment 1000 can implement one or more embodiments of the process flows of FIGS. 6-9 to facilitate computer update performance assessment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s)

1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      generating a non-sensitive identifier for sensitive data at a spoke in a hub-and-spoke configuration,
         wherein the hub-and-spoke configuration comprises a hub device and a group of spoke devices that comprises the spoke,
         wherein the hub device is configured to manage the group of spoke devices,
         wherein the sensitive data comprises topology data of the hub-and-spoke configuration, hub configuration data of the hub-and-spoke configuration, or spoke node configuration data of the hub-and-spoke configuration, and
         wherein the non-sensitive identifier identifies the sensitive data independently of storing information from the topology data, the hub configuration data, or the spoke node configuration data of the hub-and-spoke configuration;
      storing an association between the non-sensitive identifier and the sensitive data, resulting in a stored association;
      sending, to the hub device, a first indication of the non-sensitive identifier, and a second indication of a type of data of the sensitive data;
      receiving, from the hub device, a management command identifying the non-sensitive identifier;
      identifying the sensitive data based on the stored association; and
      performing the management command based on the sensitive data.

2. The system of claim 1, wherein the sensitive data is first sensitive data, and wherein the operations further comprise:
   changing the first sensitive data to second sensitive data; and
   updating the stored association between the non-sensitive identifier and the first sensitive data to reference the second sensitive data while maintaining the non-sensitive identifier constant.

3. The system of claim 1, wherein the sensitive data comprises an identifier of a device of the spoke or an access credential to the device.

4. The system of claim 1, wherein the sensitive data comprises a device, a salt value, an Internet Protocol (IP) address, an account name, or a password.

5. The system of claim 1, wherein the generating of the non-sensitive identifier is based on a universally unique identifier, a monotonically increasing number, or a timestamp.

6. The system of claim 1, wherein the spoke comprises a control node and a group of devices, wherein the control node is configured to control the group of devices.

7. The system of claim 6, wherein the control node is configured to control a respective application on the group of devices.

8. A method, comprising:
   generating, by a system comprising a processor, an identifier for data associated with a hub-and-spoke architecture, wherein a spoke of the hub-and-spoke architecture is configured to receive management commands by a hub device of the hub-and-spoke architecture, wherein the data comprises topology data of the hub-and-spoke architecture, hub configuration data of the hub-and-spoke architecture, or spoke node configuration data of the hub-and-spoke architecture, and wherein the non-sensitive identifier identifies the sensitive data independently of storing information of the topology data, the hub configuration data, or the spoke node configuration data of the hub-and-spoke configuration;
   storing, by the system, an association between the identifier and the data at the spoke, resulting in a stored association;
   receiving, by the system, a management command from the hub device, the management command comprising the identifier;
   identifying, by the system and from the identifier, the data based on the stored association; and
   performing, by the system, the management command based on the data.

9. The method of claim 8, wherein the identifier identifies a device name of a device of the spoke.

10. The method of claim 9, wherein the data is used to determine a hostname of the device.

11. The method of claim 10, wherein the identifier and the hostname are used to determine an account of the device.

12. The method of claim 11, wherein the identifier and the account are used to determine a password of the device.

13. The method of claim 9, wherein the data is used to determine a salt of the device.

14. The method of claim 8, wherein the stored association between the identifier and the data comprises a key-value pair, wherein a key of the key-value pair comprises the identifier, and wherein a value of the key-value pair comprises the data.

15. A non-transitory computer-readable medium comprising instructions that, in response to execution, cause a system comprising a processor to perform operations, comprising:
   generating an identifier for data from a hub-and-spoke organization that comprises a hub node and spokes comprising a spoke corresponding to the hub node, wherein the data comprises topology data of the hub-and-spoke organization, hub configuration data of the hub-and-spoke organization, or spoke node configuration data of the hub-and-spoke organization;
   storing an association between the identifier and the data at the spoke, resulting in a stored association;
   receiving a management command from the hub node that references the identifier;
   identifying, based on the identifier and the stored association, the data; and performing the management command based on the data.

16. The non-transitory computer-readable medium of claim 15, wherein the identifier is generated at the hub node.

17. The non-transitory computer-readable medium of claim 15, wherein the identifier is generated at a spoke control node of the spoke.

18. The non-transitory computer-readable medium of claim 15, wherein the data comprises a password, and wherein the data is generated at the hub node.

19. The non-transitory computer-readable medium of claim 15, wherein the data comprises a password, and wherein the data is generated at a spoke control node of the spoke.

20. The non-transitory computer-readable medium of claim 15, wherein the spoke comprises multiple devices arranged in a topology, wherein the spoke is configured to receive management commands from the hub node that identify the identifier, wherein the management commands manage the multiple devices, and wherein the hub node lacks knowledge of the topology.

* * * * *